United States Patent
Bouis et al.

(10) Patent No.: US 12,132,700 B2
(45) Date of Patent: Oct. 29, 2024

(54) MILITARY TRUSTED INTERWORKING FUNCTION TO INTEGRATE NON-IP TACTICAL NODES INTO A 5G NETWORK

(71) Applicant: Rockwell Collins, Inc., Cedar Rapids, IA (US)

(72) Inventors: Jeffrey D. Bouis, Frisco, TX (US); Naveen Rajanikantha, Marion, IA (US); John V. Thommana, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/670,701

(22) Filed: Feb. 14, 2022

(65) Prior Publication Data

US 2023/0262021 A1    Aug. 17, 2023

(51) Int. Cl.
| | |
|---|---|
| *H04L 61/2521* | (2022.01) |
| *H04L 61/106* | (2022.01) |
| *H04W 12/03* | (2021.01) |
| *H04W 12/06* | (2021.01) |

(52) U.S. Cl.
CPC ........ *H04L 61/2535* (2013.01); *H04L 61/106* (2013.01); *H04W 12/03* (2021.01); *H04W 12/06* (2013.01)

(58) Field of Classification Search
CPC ...... H04L 61/106; H04W 12/03; H04W 12/06
See application file for complete search history.

(56) References Cited

U.S. PATENT DOCUMENTS

| | | | | |
|---|---|---|---|---|
| 8,880,868 | B1* | 11/2014 | Shultz | H04L 49/35 713/150 |
| 9,059,768 | B1* | 6/2015 | Sorsby | H04B 1/123 |
| 10,615,831 | B1* | 4/2020 | Moore | H04B 7/18506 |
| 2013/0152175 | A1* | 6/2013 | Hromoko | H04W 36/0011 709/206 |
| 2013/0343225 | A1* | 12/2013 | Richards | H04L 12/6418 370/254 |
| 2016/0173987 | A1* | 6/2016 | Ford | H04B 1/1676 381/300 |
| 2017/0004318 | A1* | 1/2017 | Griffith | G06F 21/85 |
| 2019/0182655 | A1* | 6/2019 | Gupta | H04W 76/27 |
| 2020/0236727 | A1* | 7/2020 | Salkintzis | H04W 28/24 |

(Continued)

FOREIGN PATENT DOCUMENTS

EP    3881606 A1    9/2021

OTHER PUBLICATIONS

Waters, K. Houston, "Saturn radio connects US forces to allies", Oct. 16, 2020, 66th Air Base Group Public Affairs, accessed at https://www.af.mil/News/Article-Display/Article/2384413/saturn-radio-connects-us-forces-to-allies/ (Year: 2020).*

(Continued)

*Primary Examiner* — Nicholas P Celani
(74) *Attorney, Agent, or Firm* — Suiter Swantz IP

(57) ABSTRACT

A system and method for implementing M-TIF to integrate one or more non-IP tactical nodes as an integral part of a 5G network includes a tactical translator. The tactical translator provides I/O functionality, message encapsulation, message translation, and IP-to-non-IP address translation. The tactical translator may be interposed between a tactical gateway and a tactical proxy to securely bridge legacy non-IP waveforms with the 5G Core.

13 Claims, 9 Drawing Sheets

(56) References Cited

U.S. PATENT DOCUMENTS

| | | | |
|---|---|---|---|
| 2020/0287977 A1* | 9/2020 | Cui | H04L 67/51 |
| 2020/0351724 A1* | 11/2020 | Guo | H04W 36/0055 |
| 2021/0176817 A1 | 6/2021 | Takakura et al. | |
| 2021/0227455 A1 | 7/2021 | Aramoto et al. | |

OTHER PUBLICATIONS

Multilevel Security, wikipedia.org, Nov. 19, 2020 (Year: 2020).*
U.S. Appl. No. 17/443,518, filed Jul. 27, 2021, Thommana et al.
U.S. Appl. No. 17/536,972, filed Nov. 29, 2021, Rajanikantha et al.
Kunz, Andreas, "Non-3GPP Access Security in 5G", Journal of ICT Standardization, Received Oct. 16, 2019 and Accepted Nov. 28, 2019, 17 pages.
Lemes, Mario Teixeira et al., "A Tutorial on Trusted and Untrusted non-3GPP Accesses in 5G Systems—First Steps Towards a Unified Communications Infrastructure", arXiv:2109.08976v2 [cs.NI] Sep. 27, 2021, URL: https://arxiv.org/abs/2109.08976, 22 pages.

\* cited by examiner

US 12,132,700 B2

MILITARY TRUSTED INTERWORKING FUNCTION TO INTEGRATE NON-IP TACTICAL NODES INTO A 5G NETWORK

BACKGROUND

Cellular infrastructure is designed to support seamless multi-radio access terminal networks. Cellular user equipment (UE) can roam seamlessly between 5th generation (5G)/4th generation (4G)/3rd generation (3G)/2nd generation (2G) networks, and the user equipment can utilize different services provided by the network infrastructure.

5G interworking with non-5G devices is defined via Non 3GPP Interworking Function (N3IWF), Trusted Non-3GPP Gateway Function (TNGF), Trusted Wireless LAN Interworking Function (TWIF), and Wireline Access Gateway Function (W-AGF). The main interfaces from the interworking function to a 5G core network is via N2 and N3 interfaces; the N3IWF, TNGF, and TWIF interface to a 5G UE or "Non-5G Capable Over WLAN" (N5CW) UE is over Wi-Fi. The interfacing of tactical radios without Wi-Fi interfaces is possible with a Military Trusted Interworking Function (M-TIF) that maintains the required N2 and N3 interfaces with the core network but terminates all the Wi-Fi related interworking functions at a proxy within the M-TIF. This eliminates changes to the tactical waveforms and related cryptographic functions within the tactical radio. However, no methodology exists to integrate one or more non-IP tactical devices in a 5G network.

SUMMARY

In one aspect, embodiments of the inventive concepts disclosed herein are directed to a system and method for implementing M-TIF to integrate one or more tactical nodes as an integral part of a 5G network. The M-TIF implements a tactical translator. The tactical translator provides I/O functionality, message encapsulation, message translation, and IP-to-non-IP address translation. The tactical translator may be interposed between a tactical gateway and a tactical proxy to securely bridge legacy non-IP waveforms with the 5G Core.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
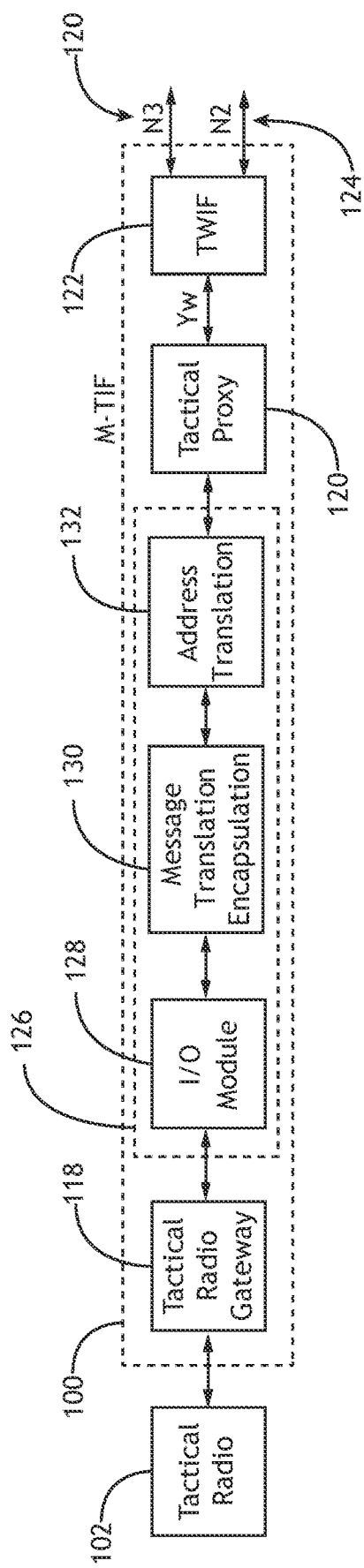
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for implementing M-TIF to integrate one or more non-IP-based tactical nodes as an integral part of a 5G network. The M-TIF implements a tactical translator. The tactical translator provides I/O functionality, message encapsulation, message translation, and IP-to-non-IP address translation. The tactical translator may be interposed between a tactical gateway and a tactical proxy to securely bridge legacy non-IP waveforms with the 5G Core. The inventive concepts disclosed herein may be better understood with reference to U.S. patent application Ser. No. 17/443,518 (filed Jul. 27, 2021) and U.S. patent application Ser. No. 17/536,972 (filed Nov. 29, 2021) which are incorporated by reference.

Referring to FIG. 1, a block diagram of a system (such as a tactical node in a network) according to an exemplary embodiment is shown. In a system with a tactical radio 102 attempting to access 5G functionality, an M-TIF 100 includes a tactical radio gateway 118, a tactical translator 126, a tactical proxy 120, and a TWIF 122. In at least one embodiment, the tactical translator 126 includes an I/O module 128, a message translation and encapsulation module 130, and an address translation module 132.

In at least one embodiment, the I/O module 128 provides an interface for interconnection with non-IP legacy tactical nodes. In addition to Ethernet, the I/O module 128 provides support for serial data communication utilizing (but not limited to) MIL-STD-1553, RS-232, RS-422, RS-485, and/or USB, along with necessary physical connectors. Internally, the I/O module 128 is a downstream interface between the tactical translator 126 and the tactical gateway node 118. The upstream interface to the tactical proxy 120 utilizes IP over Ethernet.

As non-IP user data plane messages are received from the tactical radio 102 via the tactical gateway 118, the M-TIF uses the tactical translator 126 to encapsulate messages into IP packets. The message encapsulation function allows the non-IP tactical data to be handed to the M-TIF tactical proxy 120 for further transmission over the 5G network. In at least one embodiment, the M-TIF message encapsulation may support the JREAP-C functionality (defined by MIL-STD-3011, Appendix C), in which Link-16 tactical data link messages are encapsulated in TCP/IP or UDP/IP. JREAP-C is one possible example; but other structures are envisioned.

The message encapsulation translation and encapsulation module 130 may include any necessary encryption/decryption as required and configured for networks such as DoD military networks; message encapsulation may require data encryption prior to transport across the 5G network. In at least one embodiment, the message translation and encapsulation module 130 may include functionality to translate the stream of bits to a format that is native to other waveforms, including IP-based waveforms (such as TTNT, in one exemplary embodiment).

As non-IP tactical user data is received and encapsulated, that newly created IP packet must be given a source IP address. The address translation module 132 associates the encapsulated packet with an IP address for routing within the 5G network. Likewise, in the downstream direction (i.e., toward the tactical nodes), the tactical translator 126 may maintain mappings between IP addresses and a tactical node (which could be a single node or the tactical gateway node), such that IP packets which are received from upstream can be de-encapsulated by the message encapsulation and translation module 130 and routed downstream to the proper non-IP tactical node(s).

In one exemplary embodiment, the tactical translator 126 listens to a terminal and receives a stream of bits from a serial bus via the I/O module 128; the I/O module 128 may be configured to recognize one of a set of serial protocols. Based on such serial protocols, the message translation and encapsulation module 130 may create one or more headers including necessary IP specific data associated with the stream of bits. The IP header may comprise TCP or UDP designations, one or more flags, including flags for identifying the serial protocol corresponding to the stream of bits. In addition, header information may include security aspects.

Because a link-16 terminal does not understand IP, routing information must be translated between IP and non-IP. The address translation module 132 may map non-IP to IP address: in one embodiment, one IP address may map to a single non-IP radio; alternatively, an IP address may map to an entire network of radios, and an end user or tactical gateway 118 may make a final routing determination.

In at least one embodiment, a single IP address is assigned by the M-TIF to all data received from a given tactical gateway 118, such that one single identity and session is shared by all the tactical nodes in this configuration. This presents the full non-IP tactical network to the 5G network as a single device. In another embodiment, the M-TIF assigns separate IP addresses to each tactical node. In this embodiment, each tactical node is presented to the 5G network as a separate device.

Figure 2:
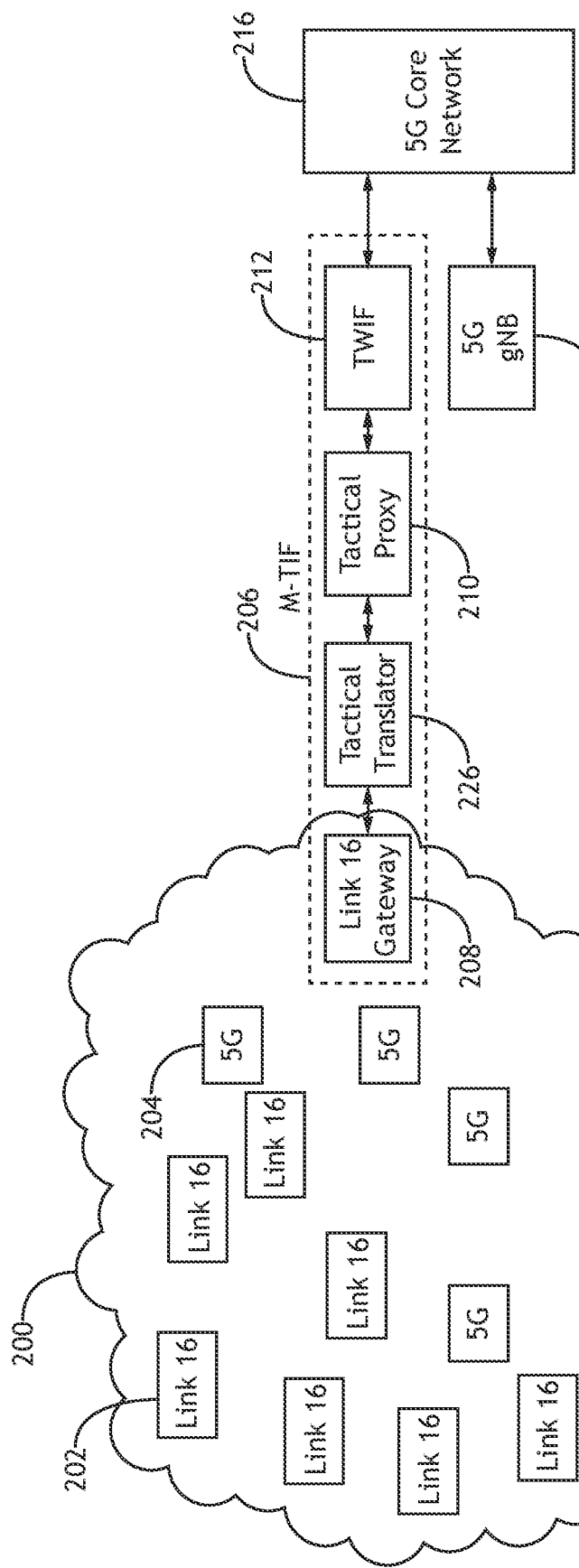
FIG. 2 shows a block diagram of a network including an exemplary embodiment.

Referring to FIG. 2, a block diagram of a network including an exemplary embodiment is shown. A tactical military network 200 including non-IP nodes 202 may interface with a 5G core network 216 via an M-TIF 206 including a tactical radio gateway 208, a tactical translator 226, a tactical proxy 210, and a TWIF 212. In at least one embodiment, a 5G gNB 214, M-TIF 206, and the components of the 5G Core Network 216 may be hosted on mobile platforms such as vehicles, ships, boats, unmanned arial vehicles, aircraft, etc. The non-IP nodes 202 can interface to the 5G core network. The 5G user equipment 204 communicates with the 5G gNB 214 and the non-IP nodes 202 which require 5G network access by using the M-TIF 206 to gain access to the 5G core network 216. In at least one embodiment, the tactical military network 200 may comprise a United States protected network (e.g., at least one secret internet protocol router network (SIPRNET) and/or at least one non-classified internet protocol router network (NIPRNET), at least one radio access node (RAN) (e.g., at least one 5G RAN), and/or at least one mobile network, some or all of which may be communicatively coupled at any given time.

Tactical nodes which utilize IP-based tactical waveforms (such as TTNT) communicate via IP into the IP-based 5G core network 216 by communicating with the tactical proxy 210 which then communicates with the TWIF 212. The 5G specifications for the TWIF 212 assume only IP communication; for that reason, the tactical proxy 210 is also IP-based. Many existing legacy waveforms and tactical datalinks, such as Link-16, Saturn, SINCGARS, VULOS, TALON, etc., are not IP-based.

Non-IP nodes 202 (such as Link-16 nodes) attempting to utilize the 5G core network 216 are not configured to produce data packets and route them in a manner useable by the 5G core network 216, and updating the functionality of every non-IP node 202 is onerous and unrealistic.

In at least one embodiment, The M-TIF 206 includes a tactical translator 226 (such as more fully defined by the tactical translator 126 shown in FIG. 1, including corresponding components) that receives data a non-IP node 202 via the tactical radio gateway 208. The tactical translator 226 includes modules or processing threads that establish I/O functionality recognizable to the non-IP nodes 202, receives the raw non-IP data via the I/O modules, and encapsulates the raw non-IP data in an IP data packet structure. The tactical translator 226 then includes IP routing information in the IP data packet structure corresponding to the destination of the raw data, either 5G user equipment 204 or potentially with reference to a table of values associating known non-IP nodes 202 with an IP address. In at least one embodiment, the associated IP address may generally indicate all non-IP nodes 202 with further information sufficient to allow the tactical gateway radio 208 to properly identify and route data to individual non-IP nodes 202.

The connectivity between a non-IP node 202 and the tactical node gateway 208 can be single-hop or multi-hop through the ad-hoc network. The tactical proxy 210 includes the relevant security features to access the 5G core network 216 as a native 5G device. The tactical proxy 210 may establish multiple 5G data connections for different non-IP nodes 202 and different applications requiring different authentication. The tactical node gateway 208 does not require any direct 5G compatibility and all 5G specific data interactions are maintained between the 5G core network 216 and the tactical proxy 210.

While embodiments illustrated in FIG. 2 show one non-IP Link-16 network interfacing to an IP 5G Network, multiple non-IP tactical, multiple IP tactical, and multiple 5G networks may be seamlessly connected via packet translation enabled by the tactical translator 226.

Figure 3:
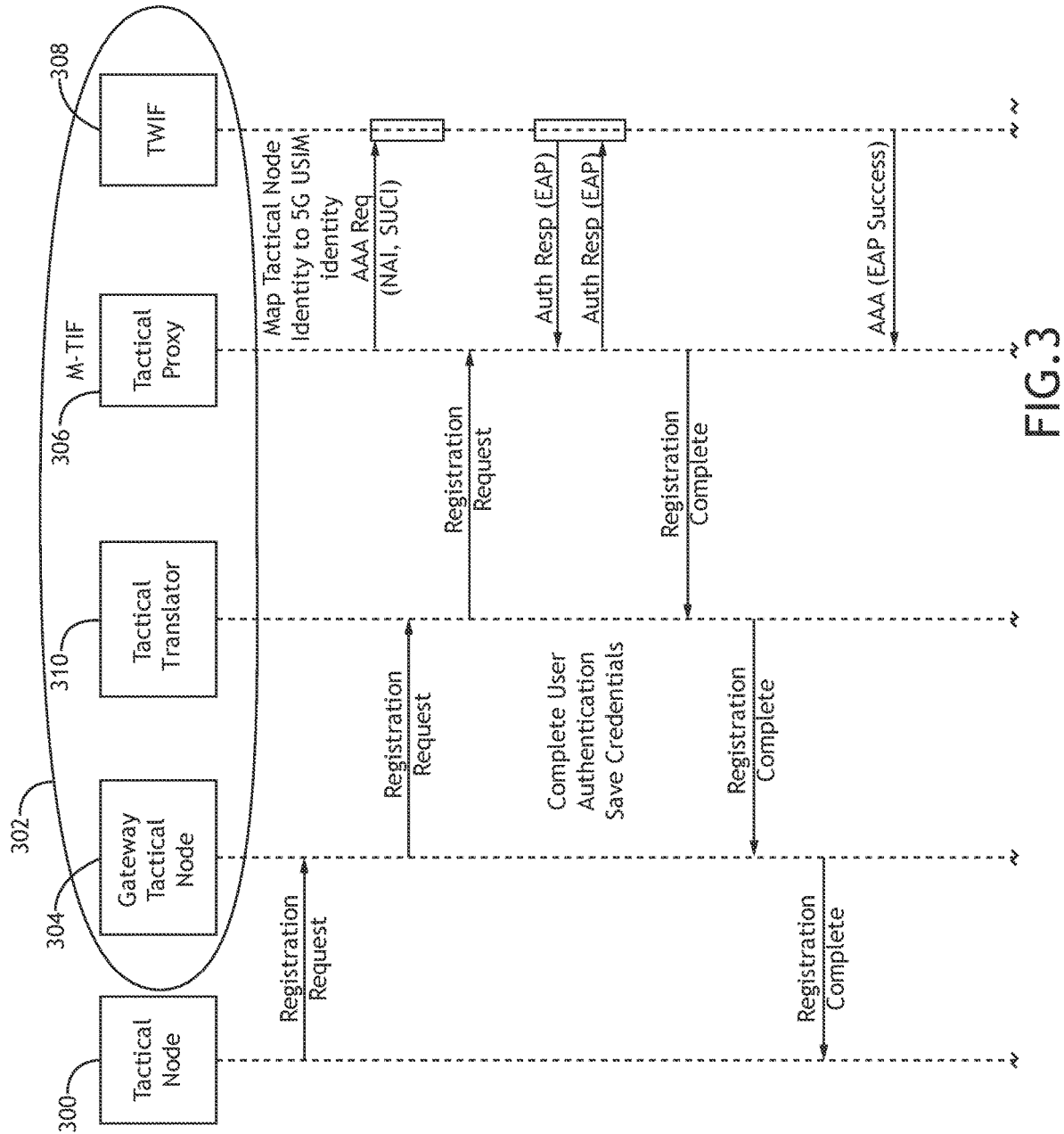
FIG. 3 shows a block diagram of data connectivity in a system according to an exemplary embodiment.
Figure 3:
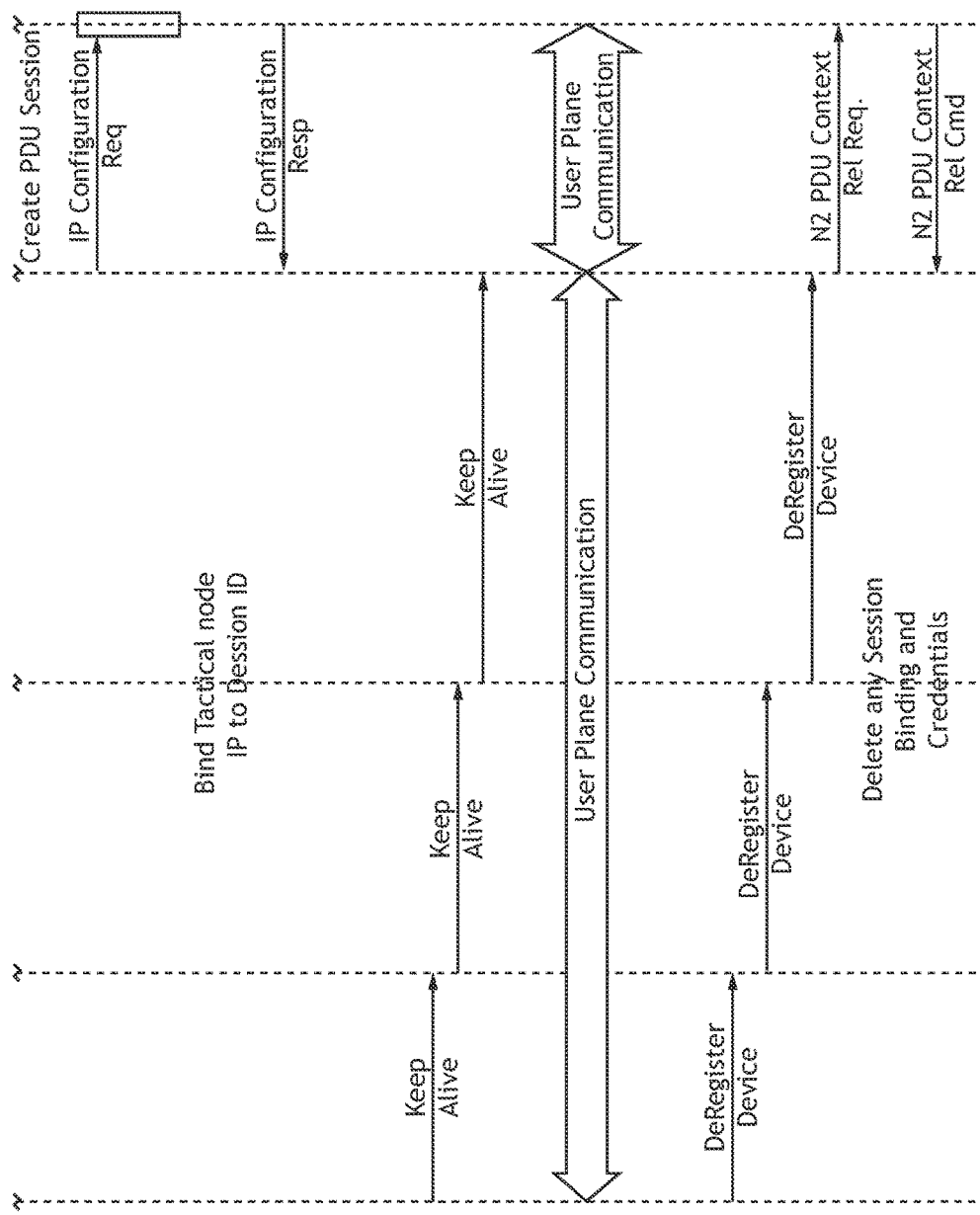

Referring to FIG. 3, a block diagram of data connectivity in a system according to an exemplary embodiment is shown. A non-IP node 300 can register with a 5G Core and become a part of the 5G network to support heterogeneous networking. A tactical translator 310 receives raw non-IP data from the non-IP node 300 and encapsulates the raw non-IP data into an IP data packet structure with an IP address and transfers the IP data packet to a tactical proxy 306. The tactical proxy 306 terminates WLAN interactions, eliminating the need for changes to the tactical waveform. Application layer messages between the non-IP node 300 and the tactical proxy 306 are introduced to initiate, manage, and terminate sessions with the 5G Core via the intermediary of the tactical translator 310. Non-IP nodes 300 may also perform a "keep alive" function to maintain registration with 5G network. The tactical proxy 306 performs a session teardown and de-registration upon receiving a de-registration request or failure to receive the "keep alive" message from the non-IP node 300. The tactical proxy 306 manages all authentication between the non-IP node 300 and the 5G network such that the non-IP node 300 does not need to have any 5G authentication capability.

The non-IP node 300 may establish a communication session with the 5G Core network via the intermediary tactical node gateway 304, tactical translator 310, and tactical proxy 306 to handle authentication and security; in at least one embodiment, the tactical node gateway 304 and tactical proxy 306 may establish a plurality of data channels for multiple non-IP nodes 300, or applications, or both, while the tactical translator 310 performs I/O functions, data encapsulation, and routing lookup for all data packets from non-IP nodes 300.

In at least one embodiment, the M-TIF device 302 (including tactical node gateway 304, tactical translator 310, tactical proxy 306, and TWIF 308) may be collocated on a platform that hosts a 5G RAN and communicates with a collocated 5G Core network. Tactical node gateways 304, tactical translator 310, tactical proxies 306, and TWIFs 308 may be collocated or discrete and separate entities; they may optionally implement cross-domain security to secure the control plane and user plane traffic. Furthermore, in at least one embodiment, the various functions of the tactical translator 310 may be hosted in a single computing device, or they may be incorporated into the tactical proxy 306. The ability to use distributed components allows maximal flexibility to fit the needs of the tactical battlespace.

In at least one embodiment, appropriate cryptographic guards may be deployed so that only authorized data can be exchanged between the 5G Core network and the tactical proxy 306 for relay to the non-IP node 300 via the tactical node gateway 304. Additionally, interfaces may optionally be extended to incorporate Department of Defense (DoD) defined security and/or authentication mechanisms.

A tactical node can register with the 5G core network and become a part of the 5G core network to support heterogeneous networking. The tactical translator 310 passes through the application layer messaging between the tactical network and the tactical proxy 306, allowing the tactical translator 310 to fit seamlessly within the framework of the M-TIF 302 for initiating, managing, and terminating sessions with the 5G core network.

Figure 4:
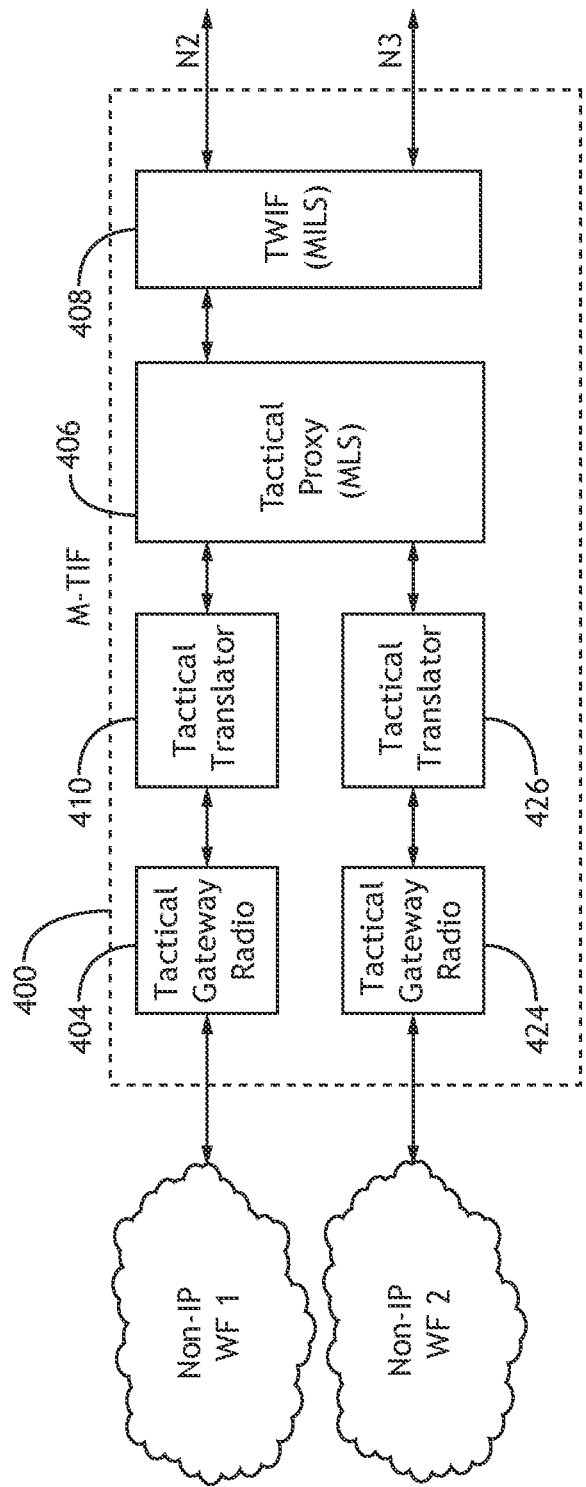
FIG. 4 shows a block diagram of a system according to an exemplary embodiment.

Referring to FIG. 4, a block diagram of a system according to an exemplary embodiment is shown. In order to leverage as many commercial off-the-shelf components as possible, in at least one embodiment, an MLS M-TIF 400 may be used on MLS platforms with an M-TIF 400 encompassing one or more tactical gateway radios 404, 424, each configured for data communication with an intermediary tactical translator 410, 426 configured to receive raw non-IP data via an I/O module or thread, translate the non-IP data if necessary, encapsulate the non-IP data into an IP data packet structure, and identify appropriate IP address routing data for the IP data packet. The IP data packet is then transferred to a tactical proxy 406.

The tactical proxy 406 includes necessary features for performing crypto guard in addition to appropriate authentication to access 5G features and maintain 5G connections for corresponding non-IP nodes via their respective tactical gateway radios 404, 424. A TWIF 408 is logically interposed between the tactical proxy 406 and UPF devices. In at least one embodiment, the TWIF 428 and UPF devices are MILS while the Tactical proxy 406 is MLS.

In every case, the M-TIF 400 assigns IP addresses for legacy non-IP interfaces. Such assignment may be statically pre-configured, or dynamically allocated by an IP allocation function. To further support heterogeneous networking and the DoD goal of rapid Joint All Domain Command and Control (JADC2), the M-TIF 400 is enhanced to support message translation. With data forwarding and routing provided by the 5G network, the message translation functionality allows messages which are generated from one tactical network to be received in another tactical network, even if the two networks are different tactical datalinks or waveforms. For example, Link-16 messages could be received by a TTNT network, or repackaged for a UHF IBS data transfer.

Figure 5:
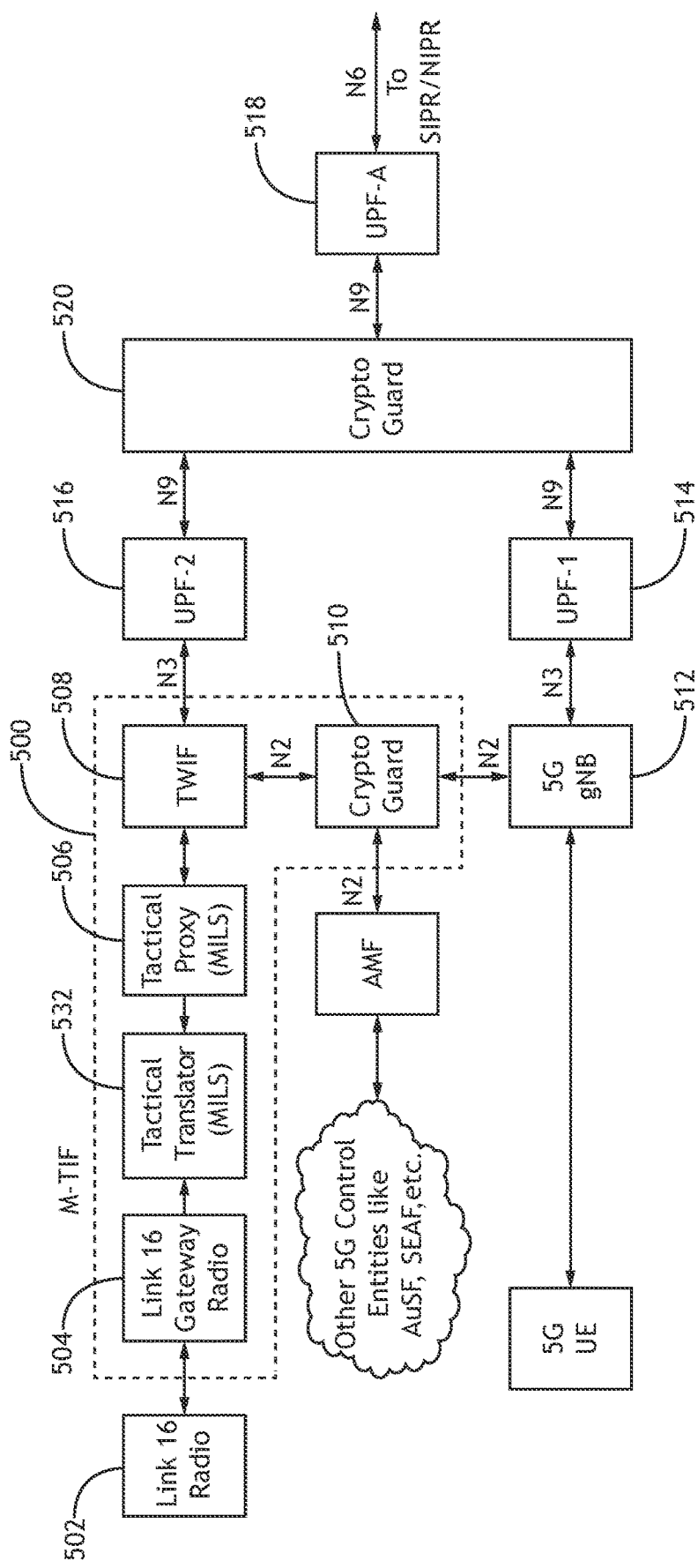
FIG. 5 shows a block diagram of a system according to an exemplary embodiment.

Referring to FIG. 5, a block diagram of a system according to an exemplary embodiment is shown. In one exemplary embodiment, the system may include an M-TIF 500 configured for multiple independent levels of security (MILS). Both the non-IP network (or mixed network) and 5G network can be deployed at any security level. A radio 502 in a non-IP node establishes a data connection to the 5G network via a Link-16 gateway radio 504 and intermediary tactical translator 532 to receive and convert non-IP data to an IP data packet structure with IP address routing information. A tactical proxy 506 includes necessary features for performing appropriate authentication to access 5G features.

A crypto guard 510 between a TWIF 508 and 5G gNB 512 ensures that only controlled control information can be exchanged with the 5G Core. Similarly, the Crypto Guard 510, 520 logically interposed between UPF-1 514, UPF-2 516, and UPF-A 518 ensures that only controlled user traffic can be routed between the Link-16 radio 502, 5G Core, and external networks (SIPRNET/NIPRNET).

Military networks abide by strict security classification rules that require segregation of networks with different security classification levels physically and/or logically. These security requirements also apply to the M-TIF 500. In at least one embodiment, both the non-IP Link-16 tactical network and 5G network can be deployed at any security level. The crypto guard 510 between the TWIF 508 and 5G gNB 512 ensures that only controlled information can be exchanged with the 5G core network. Similarly, the crypto guard 520 between UPF-1 514, UPF-2 516, and UPF-A 518 ensures that only controlled traffic can be routed between the Link-16 tactical, 5G, and external networks (SIPRNET/NIPRNET).

Figure 6:
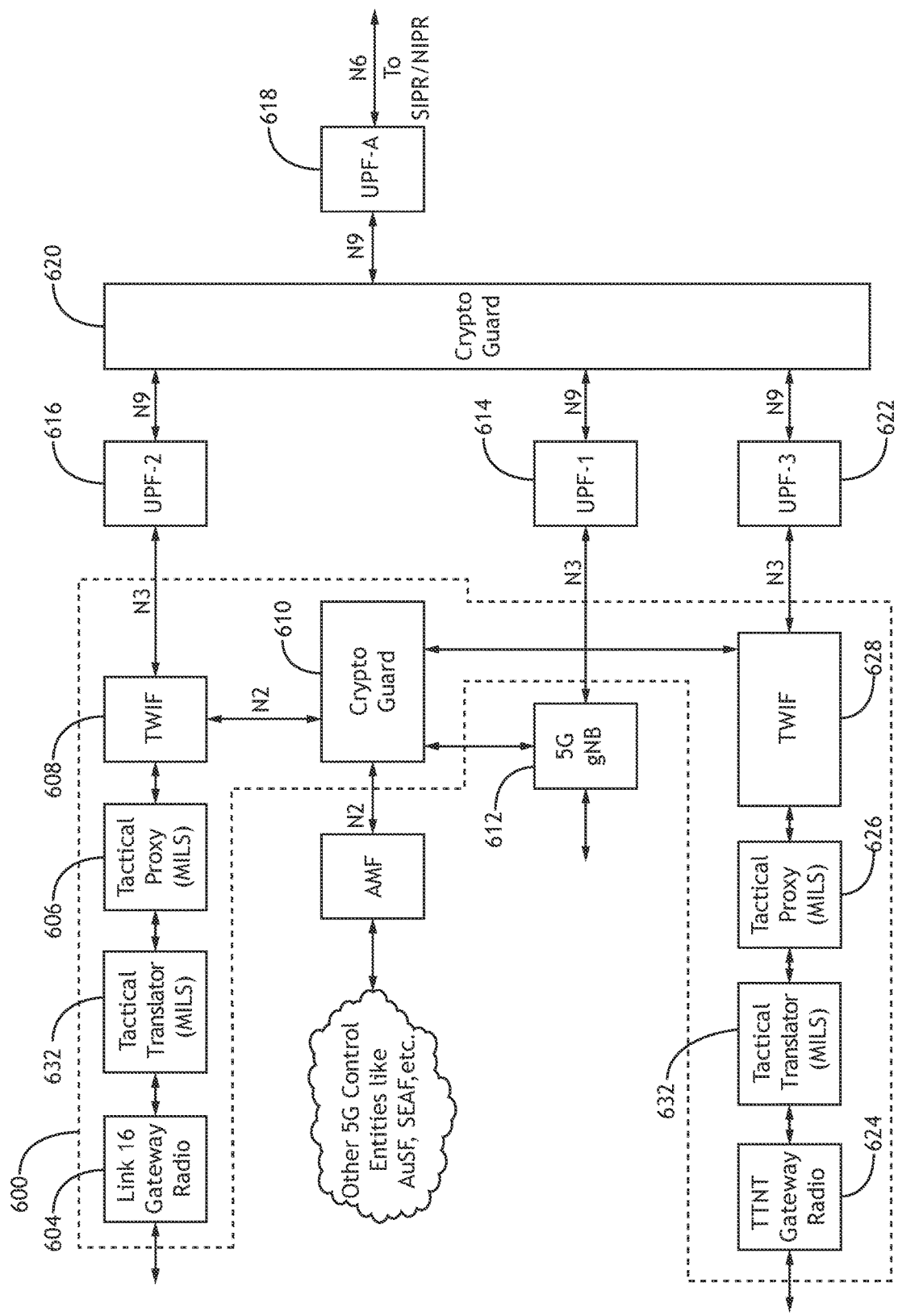
FIG. 6 shows a block diagram of a system according to an exemplary embodiment.

Referring to FIG. 6, a block diagram of a system according to an exemplary embodiment is shown. In at least one embodiment, additional networks at different security levels may be added to support heterogeneous networking. Multiple 5G Networks operating in different frequency bands or different configurations can also be accommodated. In at least one embodiment, one network may comprise an IP based network (such as TTNT or TSM) with another network may comprise a non-IP based network (such as Link-16).

The system may include an M-TIF 600 encompassing multiple gateway radios 604, 624 and at least one intermediary tactical translator 632 to receive and convert non-IP data to an IP data packet structure with IP address routing information. Tactical proxies 606, 626 include necessary features for performing appropriate authentication to access 5G features and maintain 5G connections for corresponding nodes via their respective gateway radios 604, 624. A crypto guard 610 between respective TWIFs 608, 628 and 5G gNB 612 ensures that only controlled control information can be exchanged with the 5G Core. Similarly, the Crypto Guards 610, 620 logically interposed between UPF devices 614, 616, 622, and a UPF-A device 618 ensures that only controlled user traffic can be routed between the TTNT and Link-16 nodes, 5G Core, and external networks (SIPRNET/NIPRNET).

An M-TIF 600 according to embodiment of the present disclosure in an MILS environment supports heterogeneous networking, with multiple networks which may be at different security levels. Multiple 5G networks operating in different frequency bands or different configurations may also be accommodated. User data may flow between separate waveforms, and these waveforms are not necessarily IP-based; a capability accomplished by the message translation enhancement of the tactical translator 632.

Figure 7:
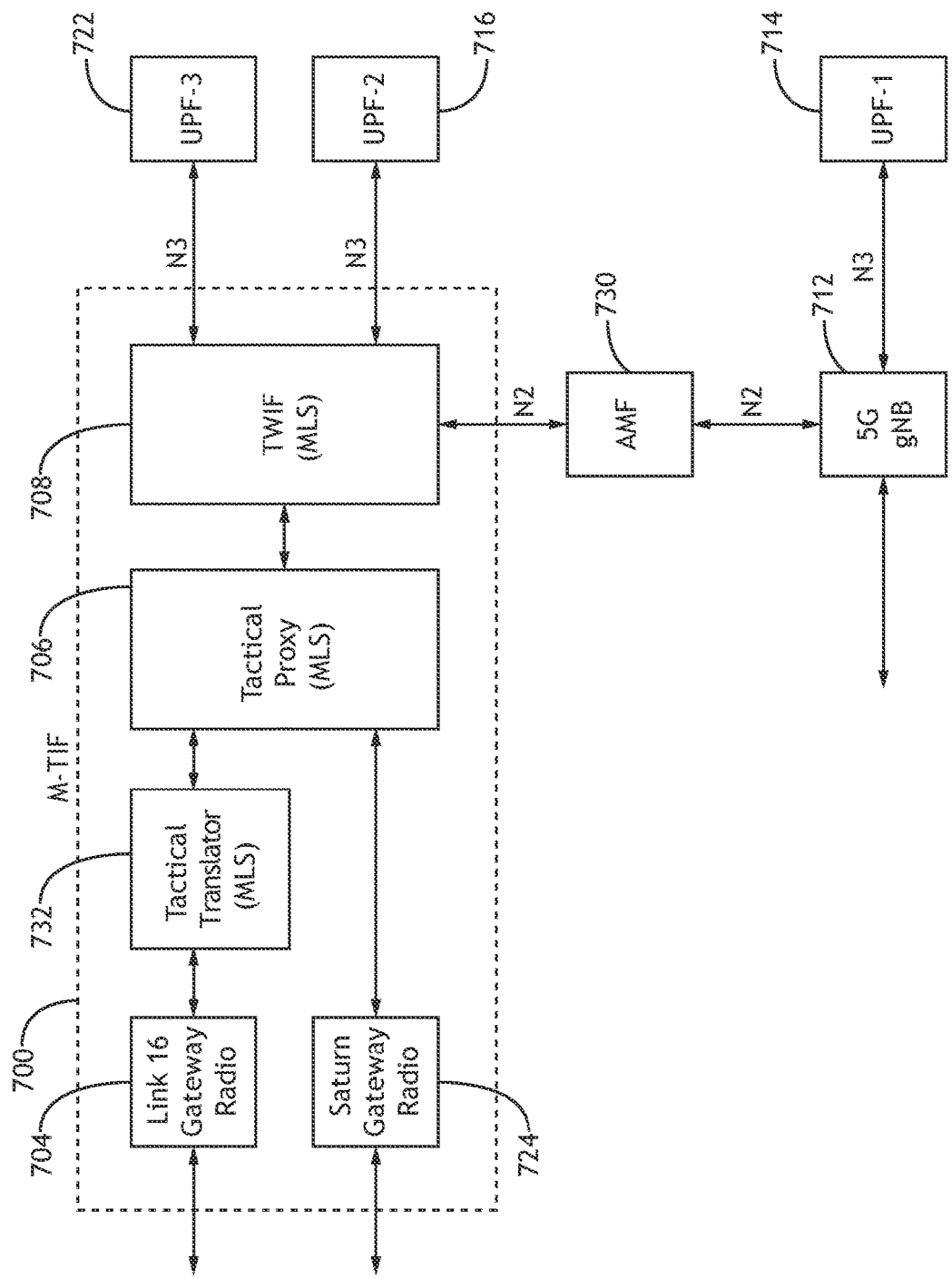
FIG. 7 shows a block diagram of a system according to an exemplary embodiment.

Referring to FIG. 7, a block diagram of a system according to an exemplary embodiment is shown. In at least one embodiment, an MLS M-TIF 700 may be used on MLS platforms. The 5G core network security architecture is unchanged. The system may include an M-TIF 700 encompassing a non-IP gateway radio 704 and another non-IP gateway radio 724, each configured for data communication with an intermediary tactical translator 732 to receive and convert non-IP data to an IP data packet structure with IP address routing information. A tactical proxy 706 includes necessary features for performing appropriate authentication to access 5G features and maintain 5G connections for corresponding non-IP nodes via their respective non-IP gateway radios 704, 724. An MLS-capable TWIF 708 is logically interposed between the MLS tactical proxy 706 and UPF-1 714, UPF-2 716, UPF-3 722, UPF-A 718, an AMF device 730, and a 5G gNB 712.

Networks may operate at any classification. The tactical proxy 706 and the TWIF 708 are configured to handle multiple levels of classification traffic; if the tactical network cannot handle multiple levels of classification internally, then multiple tactical gateway radios 704, 724 (such as Link-16 or Saturn) are employed so that the tactical proxy 706 may route appropriate data on the appropriate network via non-IP to IP routing translation provided by the tactical translator 732.

Figure 8:
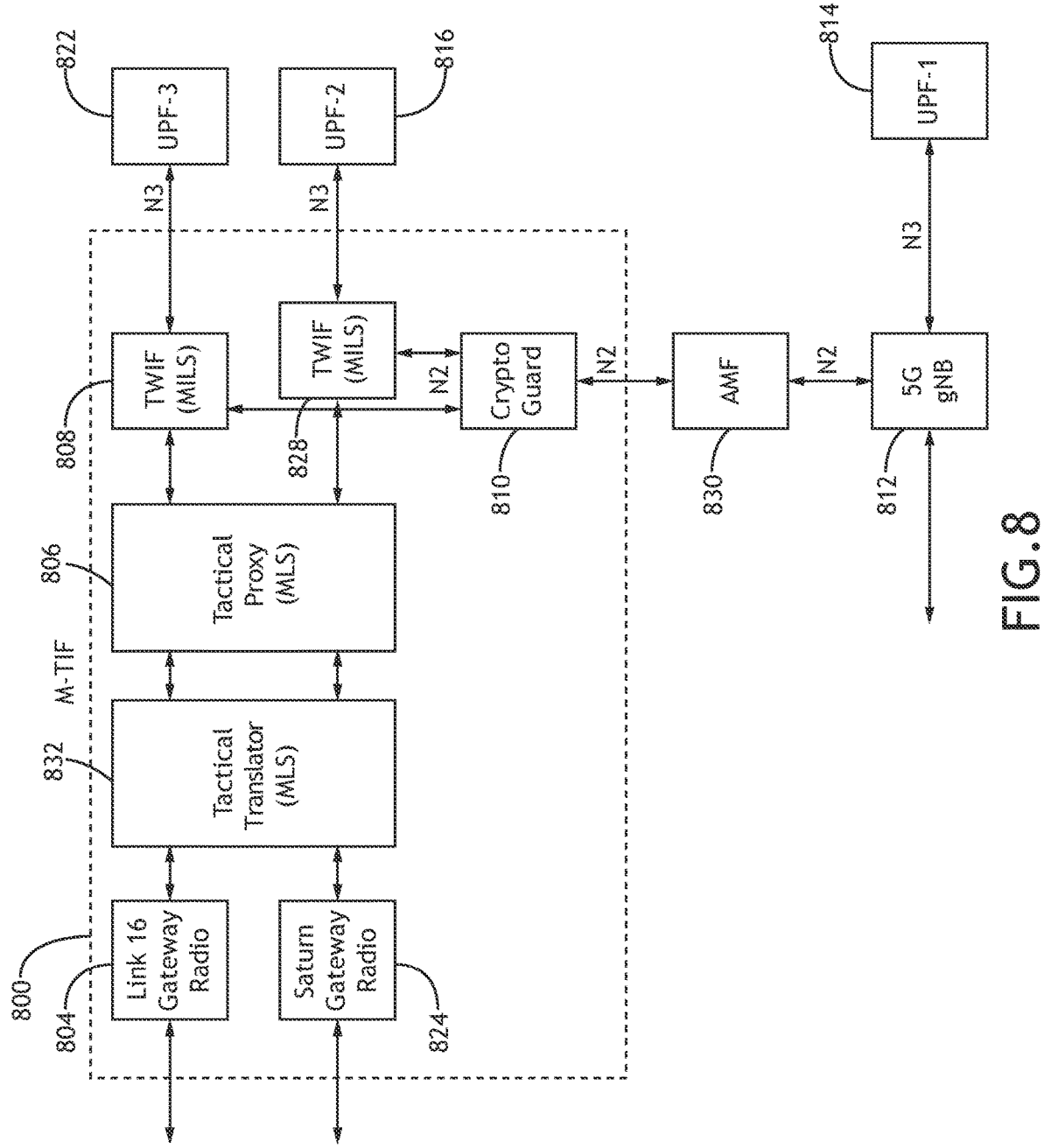
FIG. 8 shows a block diagram of a system according to an exemplary embodiment.

Referring to FIG. 8, a block diagram of a system according to an exemplary embodiment is shown. In order to leverage as many commercial off-the-shelf components as possible, in at least one embodiment, an MLS M-TIF 800 may be used on MLS platforms with an M-TIF 800 encompassing a non-IP Link-16 gateway radio 804 and a non-IP Saturn gateway radio 824, each configured for data communication with an intermediary tactical translator 832 to receive and convert non-IP data to an IP data packet structure with IP address routing information. A tactical proxy 806 includes necessary features for performing crypto guard in addition to appropriate authentication to access 5G features and maintain 5G connections for corresponding non-IP nodes via their respective gateway radios 804, 824; and separate TWIFs 808, 828 logically interposed between the tactical proxy 806 and UPF devices 814, 816, 822, 818, an AMF device 830, and a 5G gNB 812.

The TWIF 828 and UPF devices 814, 816, 822, 818 are MILS while the tactical translator 832 and tactical proxy 806 are MLS. A crypto guard 810 is logically interposed between the TWIF 828 and the AMF 830. Furthermore, in at least one embodiment, a crypto guard is disposed between a UPF-A device and other UPF devices 814, 816, 822 so that traffic at different classification levels is kept separate and only appropriate traffic can be routed between them.

In at least one embodiment, the interfaces presented by the TNGF/N3IWF/TWIF towards the tactical proxy are slightly different, but the functions to be performed by the tactical proxy do not change. The tactical proxy originates and terminates all Wi-Fi related transactions expected by the Y2/Ta/Yw interfaces to spoof the interworking function into functioning as though there is real 5G+Wi-Fi or Wi-Fi device at the other end.

In at least one embodiment, the tactical proxy hosts a UICC/USIM functionality and performs identity and authentication management on behalf of all tactical devices in the 5G network. The tactical proxy takes on this functionality, thereby keeping the 5G specifics from the tactical non-IP node and minimizing changes to the tactical non-IP nodes.

Embodiments of the present disclosure provide a secure and transparent method for non-IP data traffic of an IP-based 5G core network. This functionality permits the DoD to deploy a seamless heterogenous network of networks with inter-network routing ability. Entire tactical networks or selective users from tactical networks can be incorporated as 5G N5CW devices that can register on demand with the tactical 5G network. Roaming across networks is seamlessly supported. Military security is retained. No details regarding frequencies, TRANSEC, COMSEC, etc., of the tactical network are available to the 5G network or the M-TIF. Policies dictate labeling of traffic to and from the M-TIF so that the tactical networks can appropriately route the information adhering to tactical networking standards.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A system, comprising: a network comprising: one or more non-IP nodes, each including at least one processor configured via non-transitory processor executable code; and a interworking function device comprising: a non-IP Link-16 gateway radio configured as a network access node to a 5G core network including at least one of a user plane function (UPF)-1 device or a UPF-2 device, and a UPF-Anchor (UPF-A) device; a non-IP Saturn gateway radio configured as a network access node to the 5G core network; a translator in data communication with each of the non-IP Link-16 gateway radio and non-IP Saturn gateway radio; and a proxy configured to establish one or more authenticated data connections to the 5G core network, and handle all data traffic between each of the one or more non-IP nodes and the 5G core network, wherein the 5G Core network is connected to at least one United States protected network; wherein the translator is configured to: receive two or more non-IP data streams from the Link-16 gateway radio and the Saturn gateway radio; and encapsulate each of the two or more non-IP data streams into an IP data packet structure; and wherein the proxy is configured to: establish at least one separate data channel for each non-IP node; establish a cryptographic guard between each non-IP node and the 5G core network, the cryptographic guards being deployed between the at least one of the UPF-1 device or the UPF-2 device and the UPF-A device, and logically interposed between two Trusted Wireless LAN Interworking Function (TWIF) elements, such that only authorized data is exchangeable between the network and the at least one United States protected network; receive a de-registration request; determine that the proxy has not received a "keep alive" request from any of the non-IP nodes; and perform a teardown and de-registration; and wherein the at least one of the UPF-1 device or the UPF-2 device and the UPF-A device are configured for multiple independent levels of security (MILS), and the translator is configured for multiple levels of security (MLS).

2. The system of claim 1, wherein the translator comprises: an I/O module embodied in a processor configured via non-transitory processor executable code, configured to receive the two or more non-IP data streams via two or more serial ports; a message translation and encapsulation module embodied in the processor configured via non-transitory processor executable code to translate bits in the two or more non-IP streams to a format native to a tactical targeting network technology (TTNT) waveform by adding one or more headers to the IP data packet structure, at least one of the headers including data indicating a level of security corresponding to the non-IP streams; and an address translation module embodied in the processor configured via non-transitory processor executable code to identify an IP address associated with the encapsulated IP data packet structure via routing information within the 5G core network and either map each non-IP node to a specific IP device address, or map all non-IP nodes to a single IP device address.

3. The system of claim 2, wherein the message translation and encapsulation module is configured to identify a data stream type associated with one of the two or more non-IP data streams and translate it to a data packet identifiable to an IP-based or non-IP based node.

4. The system of claim 1, wherein the at least one United States protected network is at least one of secret internet protocol router network (SIPRNET) or non-classified internet protocol router network (NIPRNET).

5. The system of claim 1, wherein the network is a mobile ad-hoc network (MANET).

6. A method, comprising: receiving two or more non-IP data streams via two or more serial ports via an I/O module embodied in a processor configured via non-transitory processor executable code, a first non-IP data stream corresponding to a Link-16 gateway radio and a second non-IP stream corresponding to a Saturn gateway radio; encapsulating each of the two or more non-IP data streams in an IP data packet structure by translating bits in the two or more non-IP streams to a format native to a tactical targeting network technology (TTNT) waveform by adding one or more headers to the IP data packet structure, at least one of the headers including data indicating a level of security corresponding to the non-IP streams; mapping a device address corresponding to a non-IP node source of the each of the two or more non-IP data streams to an IP address by identifying an IP address associated with the encapsulated IP data packet structure via routing information within a 5G core network including at least one of a user plane function (UPF)-1 device or a UPF-2 device, and a UPF-Anchor (UPF-A) device; receiving a de-registration request via a proxy configured to establish a plurality of authenticated data connections to the 5G core network; establishing at least one separate data channel for each non-IP node via the proxy; establishing a cryptographic guard between each non-IP node and the 5G core network via the proxy, the cryptographic guards being deployed between the at least one of the UPF-1 device or the UPF-2 device and the UPF-A device, and logically interposed between two Trusted Wireless LAN Interworking Function (TWIF) elements, such that only authorized data is exchangeable between the network and the at least one United States protected network; determining that the proxy has not received a "keep alive" request from any of the non-IP data streams; and perform a teardown and de-registration, wherein the at least one of the UPF-1 device or the UPF-2 device and the UPF-A device are configured for multiple independent levels of security (MILS), and the translator is configured for multiple levels of security (MLS).

7. The method of claim 6, wherein mapping comprises mapping each non-IP node to a specific IP device address.

8. The method of claim 6, wherein mapping comprises mapping all non-IP nodes to a single IP device address.

9. The method of claim 6, wherein encapsulating comprises identifying a data stream type associated with one of the two or more non-IP data streams and translating it to a data packet identifiable to an IP-based node.

10. A interworking function device comprising: a non-IP Link-16 gateway radio configured as a network access node to a 5G core network including at least one of a user plane function (UPF)-1 device or a UPF-2 device, and a UPF-Anchor (UPF-A) device; a non-IP Saturn gateway radio configured as a network access node to the 5G core network; a translator in data communication with each of the non-IP Link-16 gateway radio and non-IP Saturn gateway radio, comprising: an I/O module configured to receive the one or more non-IP data streams via one or more serial ports; a software defined message translation and encapsulation module configured to translate bits in the one or more non-IP streams to a format native to a tactical targeting network technology (TTNT) waveform by creating an IP data packet structure and adding one or more headers to the IP data packet structure, at least one of the headers including data indicating a level of security corresponding to the non-IP streams; and a software defined address translation module configured to identify an IP address associated with the encapsulated IP data packet structure via routing information within the 5G core network and either map each non-IP node to a specific IP device address, or map all non-IP nodes to a single IP device address; and a proxy configured to establish one or more authenticated data connections to the 5G core network, and handle all data traffic between each of the one or more non-IP nodes and the 5G core network, wherein the 5G Core network is connected to at least one United States protected network; wherein the translator is configured to: receive one or more non-IP data streams; and encapsulate each of the one or more non-IP data stream into the IP data packet structure; wherein the proxy is configured to: establish at least one separate data channel for each non-IP node; establish a cryptographic guard between each non-IP node and the 5G core network, the crypto graphic guards being deployed between the at least one of the UPF-1 device or the UPF-2 device and the UPF-A device, and logically interposed between two Trusted Wireless LAN Interworking Function (TWIF) elements, such that only authorized data is exchangeable between the network and the at least one United States protected network; receive a de-registration request; determine that the proxy has not received a "keep alive" request from any of the non-IP nodes; and perform a teardown and de-registration; and wherein the at least one of the UPF-1 device or the UPF-2 device and the UPF-A device are configured for multiple independent levels of security (MILS), and the translator is configured for multiple levels of security (MLS).

11. The interworking function device of claim 10, wherein the message translation and encapsulation module is configured to identify a data stream type associated with one of the one or more non-IP data streams and translate it to a data packet identifiable to an IP-based or non-IP based node.

12. The interworking function device of claim 10, wherein the at least one United States protected network is at least one of secret internet protocol router network (SIPRNET) or non-classified internet protocol router network (NIPRNET).

13. The interworking function device of claim 10, wherein the network is a non-IP network.

* * * * *